3,317,284
FUSION PROCESS FOR PRODUCTION OF STOICHIOMETRIC UO₂

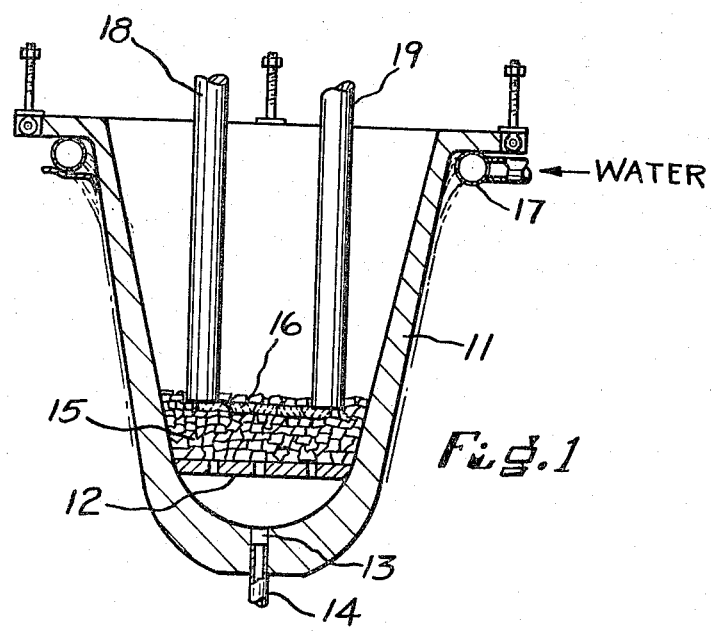
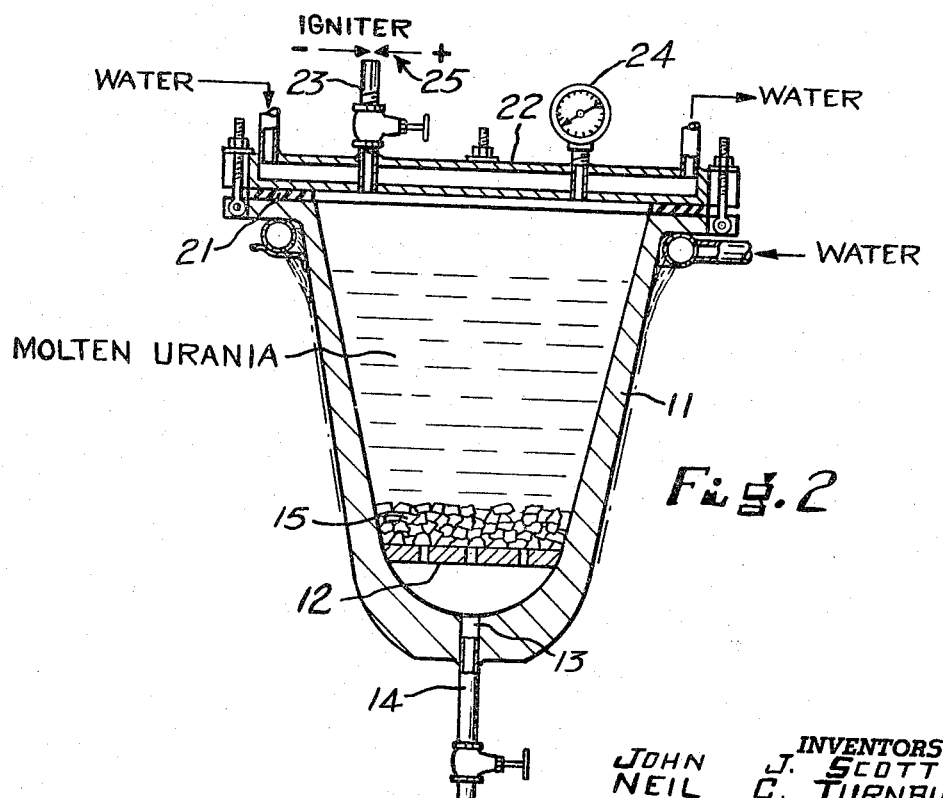

John J. Scott, Chippawa, Ontario, and Neil C. Turnbull, Niagara Falls, Ontario, Canada, assignors to Norton Company, Worcester, Mass., a corporation of Massachusetts
Filed June 6, 1963, Ser. No. 286,009
3 Claims. (Cl. 23—355)

This invention relates to a method for producing crystalline UO₂ particularly for use in nuclear reactor fuel elements.

Uranium oxide suitable for use in fuel elements should be free of contamination by such materials as uranium metal and excess oxygen and nitrogen. Free uranium is undesirable because of possible reaction with the fuel element cladding or with the coolant in case of a break in the cladding. Gases generated when material containing excess oxygen or nitrogen is heated present the danger of rupture of the fuel element cladding. Excess oxygen also reduces the thermal conductivity of the material.

UO₂ is the most thermally stable of the oxides of uranium under operating reactor conditions. The thermal decomposition of other oxides renders them unacceptable for the production of clad fuel elements because of the oxygen released or the volume change of the material or both, depending upon what oxides are involved. For these reasons it is desirable that the O to U ratio be held within limits of from 1.98 to 2.03. Unfortunately, the nature of uranium dioxide is such that small amounts of oxygen can be added or removed from a mass of fused material without necessarily changing its apparent physical appearance. It is therefore difficult to produce a pure stoichiometric UO₂ in that, in a sense, the oxides of uranium do not follow the law of definite proportions.

UO₂ is unstable in the presence of oxygen due to the following reactions among others:

and
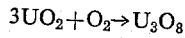
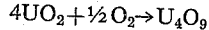

$$3UO_2 + O_2 \rightarrow U_3O_8$$

$$4UO_2 + \tfrac{1}{2}O_2 \rightarrow U_4O_9$$

In the past, attempts have been made to produce dense crystalline uranium dioxide by melting uranium oxides in an electric arc furnace and allowing the melted mass to solidify.

It was expected that such processing would result in a mass of the stable oxide, UO₂. The results did not bear out the expectations, however. Difficulties are encountered in that excess reduction during the fusion results in elemental uranium metal in the product, and oxidation during the cooling of the product results in a product high in oxygen and nitrogen. Careful control of fusion conditions and even cooling in inert atmospheres have not been entirely successful.

It is an object of this invention to provide an economical process for the production of dense, coarsely crystalline, stoichiometric uranium dioxide.

It is a further object to provide a process for producing coarsely crystalline uranium oxide having an O/U ratio between 1.98 and 2.03, essentially free of contamination by nitrogen, carbon, and elemental uranium.

It is a further object to produce high purity stoichiometric UO₂ from raw materials having an O to U ratio of 3.00 or less.

In preparing to follow the teachings of the present invention any oxides of uranium or mixed oxides are fused in an arc furnace of the type sometimes referred to as an arc-resistance furnace. Referring to FIGURE 1, a water cooled furnace shell 11 is provided. A standard method of water cooling is by means of annular pipe 17 which directs water down the outer side of the furnace shell.

The furnace shell 11 has means to flow gas through the furnace contents. In the illustrated equipment this means comprises a plate 12 fixed near the bottom of the shell and a gas inlet 13 leading from conduit 14 to the space below plate 12. Not shown in the drawing are the power connections for the electrodes 18, 19, the control means for the electrodes, and the hood over the furnace for collecting dust and gases.

In starting up the process, assuming about a four cubic foot capacity furnace shell of the general configuration shown in the drawing, a six inch layer 15 of urania lumps is placed over the perforated plate 12. A carbon bridge is then formed by placing lumps of graphite 16 in a trough in the initial charge (about 200 pounds) of urania. This bridge forms a conducting link between electrodes 18, 19 when they are initially lowered and the power is turned on. In this manner an arc is struck and as the graphite bridge burns out, the urania starts to melt from the heat of the arc, but the insulating layer between the plate and the fused material is, of course, maintained. The graphite of the bridge and of the electrodes should be of the highest purity available. After the arc has started it may be desirable to remove the remaining graphite of the bridge to avoid excess reduction.

After the arc is struck and the molten urania becomes conductive, feed is added. The electrodes are slowly raised as the molten charge builds up, as in the conventional operation of the arc-resistance furnace. The normal manner of accomplishing this is to automatically regulate the position of the electrodes in accordance with the power consumed. By means of automatic equipment, well known in the art, fluctuations in power load cause the electrodes to move up or down to maintain a substantially constant power input to the furnace. As a result of this automatic control, the electrodes gradually rise as the level of the molten charge rises. In a furnace of four cubic foot capacity, the power will be held between 150 and 250 kilowatts. The rate of feed of urania is held between from 0.8 to 2 pounds per kilowatt hour, and thus in about five hours the furnace is from three-quarters to four-fifths full. At this point the power is shut off.

To this point the process we have described, that is the production of a molten mass of urania, is conventional practice and forms no part of the present invention.

Instead of merely allowing the molten mass to cool in the furnace in the normal manner, in following the practice of the present invention, a short time before shutting off the power to the furnace we supply argon through conduit 14 to the bottom of the furnace to purge the contents of the furnace of atmospheric and reaction product gases. Good results are achieved when the flow rate and duration of the purge are adjusted so that the volume of purge gas at standard conditions is equal to the volume of the furnace. Obviously 4 cubic feet of argon at about atmospheric temperature and pressure, considerably expands in volume when heated by the furnace contents, and is equal in volume to several times the volume of the furnace.

As soon as the power is taken off the furnace and the electrodes are raised high enough to allow the shell to be pulled clear of the furnace hood, a water cooled lid is clamped on the furnace. As shown in FIGURE 2, a gasket 21, which may be of gum rubber, ensures a gas tight seal between the furnace and cover 22. A vacuum pump connected to valved outlet 23 on the lid is then actuated and the argon flow to the furnace is stopped. The vacuum pump is then allowed to exhaust gases from the furnace down to a vacuum of about 23 inches of mercury as indicated by pressure gauge 24 on the lid 22. Argon is then reintroduced into the shell through conduit 14 to purge any residual oxygen and nitrogen from the furnace. As soon as the argon purge is completed hydrogen is introduced along with the argon. The argon flow is decreased but not entirely cut off at this time to ensure a positive pressure within the shell. An igniter 25 positioned at the gas outlet 23 on the furnace lid insures the ignition of any unreacted hydrogen coming out of the furnace to prevent any explosive mixtures being built up in the atmosphere. After the hydrogen has been flowing for several hours and is burning at the outlet 23, the hydrogen flow is cut off and the argon flow is increased to purge any remaining hydrogen. As soon as the flame disappears, indicating that all the hydrogen has been removed from the furnace, the outlet 23 on the lid is closed and pressure is allowed to build up to 5 inches of mercury (gauge pressure). The argon flow is controlled to maintain this slight positive pressure and the furnace cooled under these conditions. When the charge has reached room temperature the furnace may be opened and the contents discharged.

The above description of the process, for the purposes of clarity, is, of course, more specific in detail than the broad concept of the invention. In essence the invention consists in:

(1) the purging of oxygen and nitrogen from a mass of molten urania,
(2) intimately subjecting the mass of urania to hydrogen gas, and
(3) cooling the mass to room temperature in the presence of a non-contaminating gas. Although argon is employed, after the hydrogen treatment, to purge the system of hydrogen, this is done to eliminate promptly the dangers of explosive atmospheres. If desired the entire cooling time could be carried out in the presence of hydrogen. Other obvious modifications of the above procedure will be apparent to those skilled in the art.

A specific run showing the production of fused stoichiometric $UO_2$ from an unfused uranium oxide will now be described.

Furnace: Steel shell, oval cross-section 4 cubic foot capacity;
Electrodes: High purity graphite, 4 inch diameter circular cross-section, 60 inches long;
Feed: 1800 lbs. of uranium oxide having the following analysis:

O/U ratio = 2.678

C = 0.034 weight percent

The furnace was started in the manner described above and the power was maintained at 230 kw. ±50 kw., while feeding the raw mix at a rate varied between 1.25 and 1.64 pounds per kilowatt hour. The transformer voltage was varied from 112 to 131 volts during the run which lasted 5 hours.

Ten minutes before removing the electrodes argon flow was started at a rate of 20 standard cubic feet per hour. After clamping the lid on the furnace the vacuum pump was started and run for three minutes to reach a vacuum of 23 inches of mercury. The valve at the outlet was closed and argon was then reintroduced to the furnace at a rate of 20 standard cubic feet per hour. When the pressure in the shell returned to atmospheric, the outlet valve was opened and argon was allowed to escape for a period of 15 minutes. At the end of this time, hydrogen was introduced at a rate of 9 standard cubic feet per hour and the argon flow was cut to 3.5 standard cubic feet per hour. This gas flow was kept up for 7½ hours at which time the argon flow was increased back to 20 standard cubic feet per hour and the hydrogen flow was cut off. As soon as the flame at the outlet extinguished, the outlet valve was closed, argon flow was continued until a positive pressure of 5 inches of mercury was built up. The furnace was then cooled for 30 hours while the slight positive pressure was maintained by a small flow of argon into the furnace shell. After 30 hours the furnace contents were discharged. The 1003.5 lbs. of product analyzed as follows:

|  | From— | To— | Average |
|---|---|---|---|
| O/U | 1.999 | 2.014 | 2.004 |
| N |  |  | 0.013 |
| C | 0.002 | 0.006 | 0.003 |

The through 10 mesh on 12 mesh grit of the crushed product was better than 85% monocrystalline and the density of the product was better than 98.5% of theoretical.

No precise limits have been determined on the amount of hydrogen required for our process. It does appear, however, that if, before the mass has cooled excessively, sufficient hydrogen is flowed through the mass in a quantity at least sufficient to reduce the impurities otherwise expected (by prediction from theory and past results without such treatment), optimum results are obtained. As can be seen from the above described example only a relatively small amount of hydrogen is required to produce excellent results in our process and little would be gained by any attempt to determine the absolute minimum of hydrogen required. As a matter of practice then, it is normal to continue the hydrogen treatment for a sufficient time to ensure that all possible benefit from the hydrogen is achieved; that is that essentially all of the removable impurities have been eliminated under the conditions of treatment.

What is claimed is:
1. A method for producing stoichiometric coarsely crystalline uranium dioxide comprising forming a molten mass of uranium oxide by melting a composition having an O to U molal ratio of 3 or less, enclosing said mass while still molten, flowing an inert gas through said mass to purge the system of free gases other than said inert gas, flowing hydrogen through said mass for a time sufficient to convert the mass to stoichiometric $UO_2$, and cooling said mass while protected from contamination by oxygen and nitrogen.
2. A process according to claim 1 in which the product is cooled in an inert atmosphere.
3. A process according to claim 2 in which said inert atmosphere is argon.

References Cited by the Examiner
UNITED STATES PATENTS

| | | | |
|---|---|---|---|
| 2,426,814 | 9/1947 | Burkhardt | 75—93 |
| 2,826,489 | 3/1958 | Wagner. | |
| 2,906,598 | 9/1959 | Googin | 23—355 |
| 3,051,566 | 8/1962 | Schwartz. | |
| 3,063,793 | 11/1962 | Rawson | 252—301.1 |
| 3,094,377 | 6/1963 | Langrod | 23—355 |
| 3,167,388 | 1/1965 | Rhodes | 23—354 |

OTHER REFERENCES

Johnson et al.: "Ceramic Bulletin," vol. 36, No. 3 (1957), pages 112–117.

CARL D. QUARFORTH, Primary Examiner.

R. L. GRUDZIECKI, Assistant Examiner.